Sept. 9, 1947.  I. COWLES  2,427,260
METALLIC CONDUIT AND COUPLING THEREFOR
Filed May 3, 1944
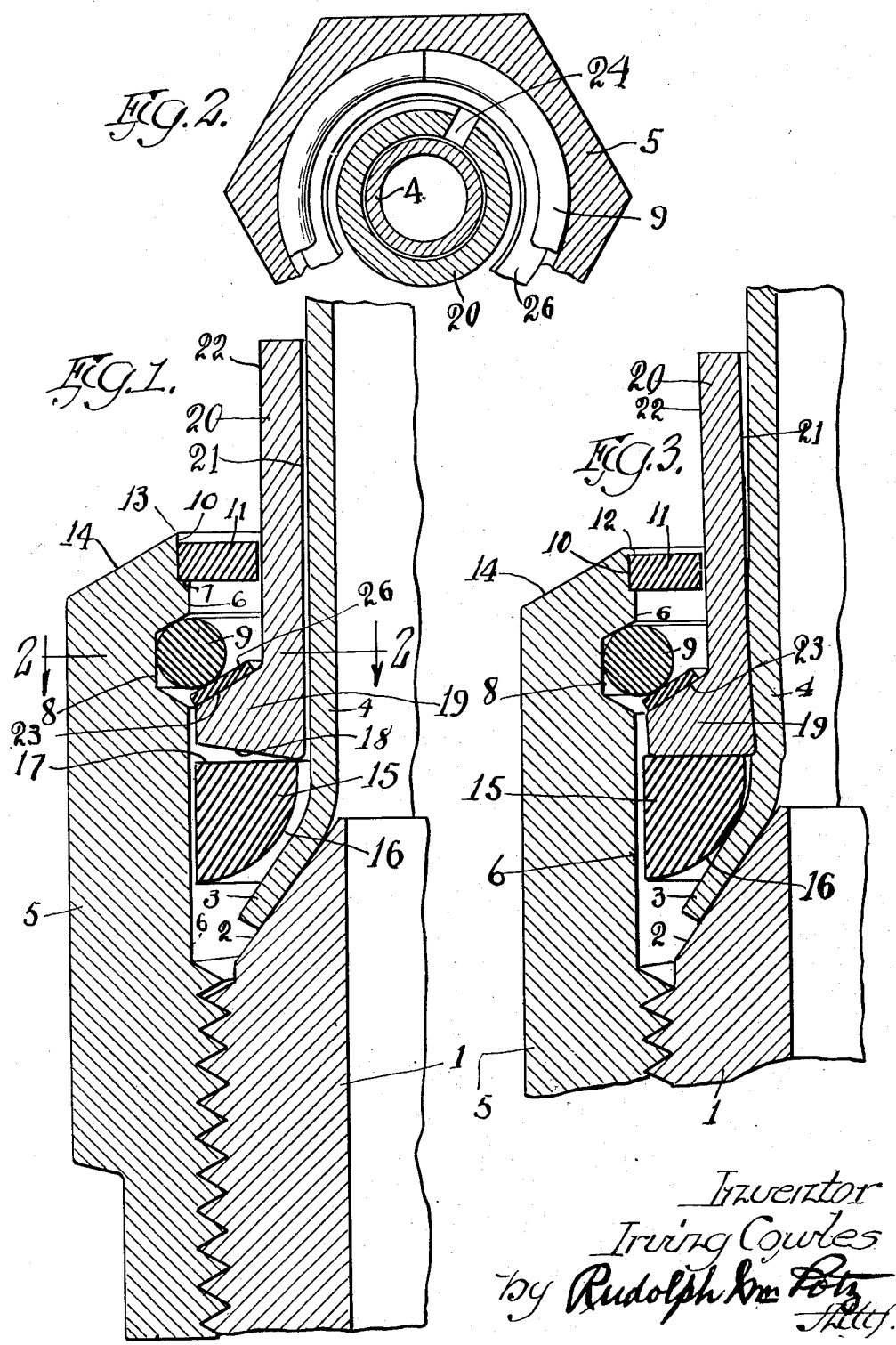
Inventor
Irving Cowles
by Rudolph Wm. Lotz Patented Sept. 9, 1947

2,427,260

UNITED STATES PATENT OFFICE 2,427,260

METALLIC CONDUIT AND COUPLING THEREFOR

Irving Cowles, Detroit, Mich., assignor of seventy per cent to himself and thirty per cent to Rudolph Wm. Lotz, Chicago, Ill.

Application May 3, 1944, Serial No. 533,857

12 Claims. (Cl. 285—86)

This invention relates to improvements in all metal conduits and couplings for the same and has for its main object to provide an all metal conduit of the flanged tube type wherein the flange of the tube is relieved of all vibration, tensile and tortional stresses.

Another object of the invention is to provide an all metal conduit wherein the seat-fitting for the flange of the tube and the nut of the coupling structure become so firmly engaged with each other by application of the customary degree of wrench force applied to said nut in completing a conduit as to obviate the loosening of the nut under the combined influences of vibration and temperature changes.

A further object of the invention is to provide a very simple and efficient coupling for such conduit which comprises an assemblage of several cooperating elements which are preassembled against disassembly and which operate automatically by the tightening of the nut to engage the flange of a tube with a fitting for fluid-tight association with the latter, to effect partial contraction of said tube at a point spaced from the flange thereof and thereby secure to the tube a device for absorbing and diffusing vibration stresses on the tube, the said contractions of the tube by said device being limited to a pre-determined degree and causing the contracted portion of the tube to cooperate with said device to relieve the tube flange of the aforesaid tensile and vibration stresses.

Another object of the invention is to provide the nut assembly with a swivel joint connection associating the nut with the said tube contracting device for transmission of force from the nut to the latter, which consists of a split ring the ends of which abut each other, thereby to eliminate the usual gap in such a ring, wherein the spaced apart ends of the ring usually act to score or indent the surfaces abutting the ring for transmission of pressure of a nut or the like to a member to be clamped against another surface.

A further object of the invention is to provide a coupling assembly which is far stronger but no less compact than the most compact type now commonly used, and which provides very important improvements over the latter in addition to such greater strength; and which may be interchanged with nuts of said other type on the same fittings.

A suitable embodiment of the invention is illustrated in the accompanying drawings, wherein:

Fig. 1 is a fragmentary central longitudinal sectional view of a conduit constructed in accordance with the invention.

Fig. 2 is fragmentary cross-sectional view of the same on a reduced scale taken on the line 2—2 of Fig. 1.

Fig. 3 is a view similar to Fig. 1 showing the parts of the conduit in their relative positions when the nut thereof is disposed at the inner limit of its movement.

The said drawings are not made to scale, but Figs. 1 and 3 are approximately four times the size of what is known as a one-half inch conduit, the tube of the latter being of one-half inch outer diameter.

The conduit comprises a fitting 1 such as any one of the several shapes mentioned above. Each such fitting includes at least one seat formation 2 for the flange 3 of the tube 4.

The sleeve nut 5 of the structure is threaded internally in one end portion to engage the threads of the fitting, as shown, the other end portion of said nut being provided with a cylindrical bore portion 6, which, in the instance illustrated, extends from the threads of said nut to the annular shoulder 7. Said bore 6 is of greater diameter than the smallest diameter of the threads of the nut and is provided with an annular recess 8 between its ends, the cylindrical wall of which is of larger diameter than said bore 6 to a degree equal to one-half the diameter of the wire of which the split ring 9 is composed, the latter being disposed within said recess 8.

The bore portion 10 of the nut 5 is of larger diameter than the bore 6 and of slightly greater length than the thickness of the washer 11 which fits said bore portion 10 and is held firmly against longitudinal movement by the flange 12 which is formed by the flattening of the normally sharp corner 13 where the bore portion 10 meets the tapered end surface 14 of the nut 5.

Disposed within the nut is an unsplit ring 15 which is of larger outer diameter than the smallest diameter of the thread of the nut and is inserted into the latter through the open outer end of the latter before washer 11 or split ring 9 are inserted.

Said ring 15, defined as a "flare-ring," is of smaller inner diameter than the flange 3 and larger outer diameter than the inner diameter of the nut-threads to prevent its escape from said threaded end of said nut. It is the part of the nut assembly to be inserted into the nut 5.

The surface 16 of the ring 15 is arcuate or substantially so in radial section so that when the same is in contact with the flange 3 it bears upon the same along only an annular line between the ends of said flange 4.

The fittings used vary as to pitches of threads and of the seats 2, respectively, the latter ranging from an angle of forty-five degrees to the axis of the fitting 1 to sharper angles, such as 37° and 35°, respectively. The flare ring 15 is thus adapted to meet the requirements of all fittings except that the threads of the nut must be made to fit those of the fitting to which said nut is intended to be applied.

The surface 17 of the outer end of the flare ring 15 is perpendicular to its axis or substantially so, and is opposed to the slightly tapered inner end surface 18 of head portion 19 of the split sleeve 20 disposed about the tube 4. The angle of taper of said inner end surface of said split sleeve is of very few degrees from being perpendicular to its axis, as, for example, two to five degrees.

The said sleeve 20 is equipped, preferably, with a substantially cylindrical bore 21. It has an outer substantially cylindrical surface 22, which extends from its outer extremity to the tapered shoulder 23 of the head end portion 19 of said sleeve. The latter is of slightly smaller diameter than the bore portion 6 of the nut 5, and is cylindrical peripherally.

The said split sleeve 20 is equipped with a single longitudinal slot or gap 24, shown in Fig. 2, which extends from end to end thereof and to the periphery of the head portion 19 and is of such predetermined width that, when closed, the inner diameter of said split sleeve 20 will be slightly less than the outer diameter of the tube 4 within a zone embraced by a contracted portion of said split sleeve 20.

Soft metal tubing, capable of being flanged easily, is commonly produced by the well-known extrusion method; some thereof being produced by other methods. The extruded type, in particular, varies in outer diameter in every size. The sizes range from three-sixteenths of an inch outer diameter to an appreciable number of larger sizes.

Because of the impossibility of producing such tubing with accuracy as to outer diameter, it is subject to what are known as "tolerances" diametrically. In the one-half inch size, the diametric tolerance allowance is five-thousandths of an inch plus or minus the exact one-half inch, so that, if the last named size is ordered from the manufacturer, it must be accepted by the purchaser so long as its outer diameter is no more than five-thousandths of an inch over or under the specified one-half inch diameter.

The inner diameter of the sleeve 20 is, therefore, always two or three-thousandths (or more) of an inch greater than the largest tolerance diameter of the tube 4 to be incorporated into the conduit, and the width of the slot or gap 24 of said sleeve 20 must, therefore, be of such width that, when closed, the inner diameter of said sleeve will be less than the outer diameter of the smallest tolerance diameter tube to be used.

It is also common, in the extruded type of tubing, that the duct thereof is slightly eccentric to its outer surface. Said duct is always of somewhat larger diameter than the bore of the fitting 1. It is thus very apparent that in order to avoid choking of the completed conduit at the point or within the zone of contraction of the tube 4 by contraction of the sleeve 20, the said slot or gap of said sleeve 20 may not be of such width as will effect contraction of the tube 4 to an inner diameter less than that of the bore or duct of the fitting 1.

After said sleeve 20 has been inserted into the nut 5, following insertion of the flare ring 10, the split ring 9 is moved into place.

While said ring 9 may be made of very resilient metal and may be of normally larger outer diameter than the greatest diameter of the recess 8 of the nut 5 and be gapped to permit contraction thereof to a sufficiently small diameter to pass through the bore portion 6 of said nut and become self-entrapped in said recess 8 by its own expansion, it is preferable to employ a split ring whose ends abut each other when engaged in said recess 8 as shown in Fig. 2, and which is composed of substantially non-resilient metal, such as soft or low carbon steel, stainless steel, or quarter hard brass.

The split sleeve 20 and nut 5 are commonly made of an aluminum alloy which is softer by far than the highly resilient metal of the usual split ring commonly employed and capable of being substituted for the ring 9 as indicated above. Said nut 5 and split sleeve present tapered surfaces such as the outer wall of the recess 8 and the shoulder 23 engaged by said ring 9 under a high degree of pressure when the nut 5 is tight. Said pressure will cause a split ring of very resilient metal to become partially embedded in the surfaces engaged thereby and this, of course, interferes with the proper performance by such ring of its function as an anti-friction element, especially at the instant that that function is most essential, viz. during the final arc of rotation of the nut relative to the fitting in completing the conduit assembly for service.

Obviously, the split ring 9 (shown in Fig. 2) must also be contracted to a diameter such as will be no greater than that of the bore portion 6 of the nut 5 and to that end its ends will be off-set axially from each other enough to pass each other to enable said ring to pass through the annular space between the bore 6 and the opposed surface of the split sleeve 20. A suitable tubular tool moves the split ring 9 to a point between the ends of the recess 8. That operation is followed by a ring expanding operation, done by another tubular tool, the final operation of bringing the ends of said ring into substantially abutting relation to each other being performed by disposing the nut 5 upon a tool fitting 1 and then tightening the nut 5 upon said tool. The shoulder 23 of the head portion of the sleeve 20 is thus compressed against the split ring to bring its ends into opposed relation to each other.

A slight gap in the split ring 9 will not matter because the soft metal of which it is composed will not indent the surfaces against which it is compressed. Said soft metal ring 9 is also incapable of scoring said surfaces under the influence of the greatest degree of pressure exerted thereupon responsive to nut tightening operation.

It is also necessary that the diameter of the bore-portion 6 of the nut be slightly greater than the greatest diameter of the tap that is first passed into the nut through its outer end and effects cutting of the threads of the said nut.

A washer 26 of stainless steel or other suitable hard metal may be disposed upon the shoulder 23 of the split sleeve 20 in instances wherein a split ring of highly resilient metal is used in place of the soft metal split ring 9 and may, of course, be used also in connection with the latter if desired.

After assembly of the nut is completed and a flanged tube is projected through the threaded end of said nut 5, the latter is threaded upon the fitting 1 to force the tube flange upon its seat, via the split ring 9. During the final turns of the nut 5, the head portion 19 of the split sleeve 20 is flexed to cause its inner end surface to meet that of the opposed end of the flare ring 15, and also effect closure of the inner extremity of the slot or gap 24 in the sleeve 20, and thus effect contraction of the head portion thereof. The remainder of said slot or gap 24 becomes only partially closed from its innermost end to a progressively less degree to the outer extremity of the sleeve 20. Thereby, the normally cylindrical bore of said sleeve 20 becomes slightly tapered at an angle which may vary from one-half to about one and one-half or two degrees to its axis. Thus the outer end portion of the sleeve 20 is spaced progressively farther from the tube from the outer end of the zone of contraction of the tube 4 to the outer extremity of said sleeve 20. It is within this zone of spacing of said sleeve from the tube 4 that vibration stresses on the free portion of the tube 4 are diffused and absorbed so that they do not reach the outermost end of the said zone of contraction of said tube.

The sleeve 20, if made of aluminum alloy, will not expand to its initial dimensions when relieved of pressure and generally resists the reverse movement of the tube preparatory to cutting off its flange 3 when same is to be replaced by another tube 4. The nut assembly is then removed from the tube and the new flanged tube projected through it. The primary movement of the nut to cause the inner end of the sleeve 20 to pass beyond the zone of contraction of the tube when the flanged end of the latter is caused to project from the threaded end of the nut 5, effects expansion of the head end portion of the sleeve 20 to substantially its initial diameter because neither split ring 9 nor the flare ring 15 can offer resistance to such expansion.

The angle of taper of the shoulder 23 of the split sleeve 20 engaged by the split ring 9 is increased when the inner end surface of the sleeve 20 is brought to bear upon the flat surface of the flare ring 13. The pressure of the split ring 9 upon the opposed surface 23 of the sleeve 20 is such in direction and degree that it effects centering of said sleeve relative to the nut and also causes the flare ring 15 to become substantially centered and effects an absolute positioning of the outer flat surface 17 thereof to extend perpendicularly of the tube and nut axes.

This is very important because in all instances wherein the duct of the tube 4 is eccentric to its outer surface, the wall thickness of the tube will vary proportionately to the degree of such eccentricity. The latter frequently causes the tube flange to be canted relative to the tube axis and its perimeter to be disposed eccentrically of the tube body.

It is obvious that when this occurs, the flare ring 15 will be normally slightly canted and when restored to normal position by the tightening pressure aforesaid, said ring will bear more firmly upon the thicker than the thinner portion of the tube flange. Consequently, the head end of the split sleeve 20 must be of ample strength to transmit to the flare ring 15 a degree of nut pressure sufficient to cause said flare ring 15 to remedy the defects of the tube flange and thus assure a fluid-tight association of the tube with the fitting 1, as well as alignment of the tube axis with the axis of the fitting 1.

Obviously, the partial contraction of the tube 4 provides the equivalent of an annular recess in its outer surface in which the portion of the sleeve 20, which effects such contraction, is engaged when the nut 5 is tight and that thereby the part of said tube 4 lying between the seat of the fitting 1 and the said annular recess, is relieved entirely of all tension and vibration stresses.

The life of the tube 4 is thus lengthened appreciably.

The washer 12 is provided mainly to close, substantially, the outer end of the nut 5 and, in part, to afford support to the outer end portion of the split sleeve 20. The latter may be of any desired thickness less than equal to the outer diameter of its head portion and the marginal portion of the shoulder 23 upon which the split ring 9 bears, and its outer surface may differ from cylindrical form.

Due to the resistance of the sleeve 20 to flexing and other causes that cannot be adequately explained, the nut 5 will not loosen under the combined influences of vibration and temperature changes to which the conduit is subjected to a very high degree when incorporated into any type of vehicle, particularly air-craft of all types.

The structure is thus very efficient, durable and compact, and can be produced at very small cost.

With respect to the substantially closed split ring 9, it is stated hereinabove that a slight gap between its opposed ends is of no consequence. That means that if the ring is of a total arcuate length of 95% or more of the complete circle which it is intended to cover, the said gap will be so narrow that it would do no harm such as attributed to a highly resilient split ring hereinabove mentioned wherein the ends of such ring are normally disposed in the plane of the whole ring.

While it is preferred to make the ring of soft metal as hereinabove described, the same may be made of hard highly resilient metal which is normally expanded to an outer diameter equal to or somewhat greater than that of the recess 8 and is flexed to an outer diameter equal to that of the bore 6 after the said ring is flexed to helical form so that its ends are offset to permit such contraction.

In such event, said ring would expand when opposed to the recess 8 and its ends would become opposed to each other in the plane of the whole ring. But unless said ends were freed of burrs resulting from the severance of the required length of wire from a longer piece, the result would still be unsatisfactory.

However, if such a resilient ring were used in the sleeve nut of the coupling shown and described in my co-pending application, Serial No. 522,248, wherein the outermost bore portion of the nut is of the same diameter as the cylindrical face of the ring receiving recess, said bore portion constitutes a gauge which determines the length of wire required to provide the closed ring. The latter could then be inserted into said bore portion and pushed through the tapered bore portion by means of a tubular tool having a helical end surface terminating in a longitudinal shoulder. That shoulder disposed in alignment with the meeting ends of the ring, would flex the latter to the aforesaid helical form which would cause its ends to become overlapped while said ring is forced through the tapered bore portion to the ring receiving recess wherein the ring will restore itself to normal form.

Obviously, when the opposed ends of the ring 9 are spaced apart a distance less than the length of gap therebetween required to enable the ring to be contracted to, an outer diameter equal to or less than the smallest diameter of the recess 8 without offsetting its ends from each other and effecting overlap thereof, the main requirement of the inventive concept is met in that the gap is necessarily shorter than it is required to be in split rings heretofore used, as far as I am informed.

It is also to be noted that though it is preferable to have the bore 6 of the nut of larger diameter than the threaded end thereof in order that the flare ring may be far stronger, and also rendered non-removable from the nut, the diameter of said bore 6 may be smaller than shown and described, and said flare ring 15 and split sleeve 20 made proportionately smaller to meet the needs of a smaller diameter bore 6.

I claim as my invention:

1. An all metal conduit comprising a fitting equipped with a seat formation, a tube equipped with a flange engaged with said seat formation, a sleeve nut having thread engagement at one end with said fitting and equipped with an axial bore of greater diameter than and extending from the inner end of the threads of said nut towards its other end, a flare ring of greater diameter than the larger diameter of said last-named threads disposed for rotation and longitudinal movement relative to the nut within the same and bearing upon the flange of said tube, the said nut provided with an internal annular recess between the ends of said bore, a radially contractible split sleeve disposed about the said tube and having an annularly enlarged inner end portion bearing upon the inner end of said flare ring, said end portion equipped with a tapered shoulder opposed to the outer end of said nut, and a split ring engaged in said annular recess of said nut and with said tapered shoulder of the inner end of said sleeve for transmitting the axial motion of said nut in one direction to said split sleeve and flare ring to compress said tube flange upon said seat formation and at the same time effect radial contraction of the innermost end portion of said split sleeve to smaller diameter than the outer diameter of said tube.

2. An all metal fluid tight conduit comprising a fitting equipped with a seat formation, a tube equipped with a flange engaged with said seat formation, a sleeve nut having thread engagement at one end with said fitting and equipped with an axial bore of greater diameter than and extending from the inner end of the threads of said nut towards its other end, a flare ring of greater diameter than the larger diameter of said last named threads disposed for rotation and longitudinal movement relative to the nut within the same and bearing upon the flange of said nut, the said tube provided with an internal annular recess between the ends of said bore, a resilient split sleeve equipped with a radially contracted head portion engaged in a radially contracted portion of said tube and bearing upon the opposed end of said flare ring for maintaining the latter pressed against the tube flange, and a split ring engaged in said annular recess of said nut, and bearing upon said head portion of said split sleeve to maintain the same contracted and in pressure exerting relation to said flare ring while said nut is disposed at the inner limit of its movement relative to said fitting.

3. An all metal conduit comprising a fitting equipped with a seat formation, a tube equipped with a flange engaged with said seat formation, a sleeve nut having thread engagement at one end with said fitting and equipped with an axial bore of greater diameter than and extending from the inner end of the threads of said nut towards its other end, a flare ring of greater diameter than the larger diameter of said last-named threads disposed for rotation and longitudinal movement relative to the nut within the same and bearing upon the flange of said tube, the said nut provided with an internal annular recess between the ends of said bore, a radially contractible split sleeve disposed about the said tube and having an annularly enlarged inner end portion bearing upon the inner end of said flare ring, said end portion equipped with a tapered shoulder opposed to the outer end of said nut, said flare ring and split sleeve equipped with opposed surfaces normally meeting only along the inner edge portion of the end surface of said flare ring and spaced progressively farther apart toward the perimeter of the latter, and a split ring engaged in said annular recess of said nut and with said tapered shoulder of the inner end of said sleeve for transmitting the axial motion of said nut in one direction to said split sleeve and flare ring to compress said tube flange upon said seat formation and at the same time effect radial contraction of the innermost end portion of said split sleeve to smaller diameter than the outer diameter of said tube, and also causing the opposed end surfaces of said flare ring and sleeve to meet over substantially their entire areas.

4. A structure as defined in claim 3 wherein the inner end surface of the flare ring is substantially perpendicular to the axis thereof.

5. A structure as defined in claim 3 wherein the outer end shoulder of the recess in the nut and the shoulder of the split sleeve opposed thereto are normally substantially parallel with each other and both extend at an angle of approximately thirty degrees to the axis of the nut.

6. A structure as defined in claim 3 wherein the outer end shoulder of the recess in the nut and the shoulder of the split sleeve opposed thereto are normally substantially parallel with each other and both extend at an angle of approximately thirty degrees to the axis of the nut, and wherein the inner end surface of the split sleeve is tapered at an angle to the axis thereof oppositely to the shoulder of said split sleeve opposed to the outer end of said nut.

7. A structure as defined in claim 1 wherein the nut is equipped with an outer end bore portion of larger diameter than the first-named bore and wherein a closure washer is permanently engaged in said larger diameter bore portion.

8. A structure as defined in claim 1 wherein the ends of the split ring abut each other substantially and the same is composed of substantially non-resilient wire.

9. A structure as defined in claim 1 wherein the opposed surfaces of the flare ring and split sleeve are normally spaced progressively farther apart from the middle to the outer edges of said surfaces with the latter in substantially full surface contact with each other when said nut is disposed at substantially the limit of its movement relative to the fitting and wherein said split sleeve is composed of resilient metal.

10. A structure as defined in claim 1 wherein the split sleeve is composed of resilient metal and is equipped with a single gap extending from end to end thereof, and wherein said gap is of a predetermined width determined by the desired limit of contraction of the tube to be effected by radial contraction of said split sleeve as limited by closure of said gap responsive to pressure of said split ring.

11. A coupling for an all metal flanged tube conduit which includes a conventional fitting having a seat for the flange of the tube, said coupling comprising a sleeve nut equipped with threads at one end to engage those of the fitting and a cylindrical bore, a flare ring within the nut adapted to bear upon the flange of a tube, a radially contractible split sleeve within the nut adapted to bear upon the flare ring, at one end, said split sleeve equipped with an annular flange at said end having a tapered surface opposed to the outer end of said nut, said nut equipped with a device engageable with said shoulder for actuation of said split sleeve by rotation of said nut in one direction, the opposed surfaces of said flare ring and split sleeve being disposed angularly of each other and spaced progressively farther apart from their middle portions to their perimeters, said split sleeve equipped with a longitudinal slot extending substantially radially and through its flange throughout a major portion of its length, said device of said nut adapted to cooperate with the shoulder of the flange of said sleeve to flex said flange to cause the opposed surfaces of said sleeve and flare ring to meet and effect contraction of the flanged end of said sleeve to smaller inner diameter than the outer diameter of said tube as said nut approaches the limit of its movement relative to the fitting.

12. An all metal conduit comprising a flanged tube, a fitting equipped with a seat for the flange of said tube, a nut having thread connection at one end with said fitting and having a cylindrical bore portion of larger diameter than the thread end portion thereof extending to its other end and terminating in an annular recess, a second annular recess between the ends of said bore portion, an externally cylindrical ring member equipped with an outer end surface extending perpendicularly of the axis of said nut and with a mouth formation at its inner end seating upon the flange of the tube, a resilient split sleeve equipped at one end with a contractible bead portion terminating in an end shoulder of frusto-conical shape bearing upon the end shoulder of said ring member and with another frusto-conical shoulder at its other end, a resilient contractible split ring mounted within the second-named annular recess of said nut bore portion and bearing upon said last-named shoulder of said split sleeve bead portion, and a washer rigidly mounted in the terminal recess of said bore portion through which said split sleeve projects.

IRVING COWLES.

REFERENCES CITED

The following references are of record in the file of this patent:

UNITED STATES PATENTS

| Number | Name | Date |
| --- | --- | --- |
| 2,320,813 | Cowles | June 1, 1943 |